INVENTOR
ALAN R. FISHER

Aug. 26, 1969  A. R. FISHER  3,463,033
MULTIPLE RATIO HYDROKINETIC TORQUE CONVERTER
TRANSMISSION WITH SPLIT-TORQUE LOCK-UP
CLUTCHES IN THE CONVERTER HOUSING
Filed Feb. 20, 1968  3 Sheets-Sheet 3

| | Line | | |
|---|---|---|---|
| | A | B | C |
| R | Cooler | Feed | Feed |
| N | Cooler | Feed | Feed |
| 1 | Cooler | Exhaust | Feed |
| 2 | Cooler | Exhaust | Feed |
| 3 | Cooler | Exhaust | Feed |
| LOCK-UP | Feed | Exhaust | Exhaust |
| TORQUE SPLIT | Cooler | Feed | Exhaust |

INVENTOR.
ALAN R. FISHER
BY
ATTORNEYS.

United States Patent Office 3,463,033
Patented Aug. 26, 1969

3,463,033
MULTIPLE RATIO HYDROKINETIC TORQUE CONVERTER TRANSMISSION WITH SPLIT-TORQUE LOCK-UP CLUTCHES IN THE CONVERTER HOUSING
Alan R. Fisher, Highland Park, Mich., assignor to Ford Motor Company, Dearborn, Mich., a corporation of Delaware
Filed Feb. 20, 1968, Ser. No. 706,945
Int. Cl. F16h 47/08; F16d 37/00
U.S. Cl. 74—688                                     12 Claims

ABSTRACT OF THE DISCLOSURE

A torque converter transmission mechanism having compound clutches in the impeller shell of the converter and multiple ratio gearing connected to the turbine of the converter, wherein the application and release of the clutches in proper sequence, together with sequential operation of torque establishing devices in the transmission gearing, effects any one of three forward driving speed ratios or a single reverse speed ratio can be obtained, one operating mode establishing a split torque path between the driving member and the driven member of the gearing and another operating mode establishing a solid, direct-drive torque path that bypasses the converter and wherein the clutches are applied and released by controlling the direction of torus fluid feed for the converter.

General description of the invention

In hydrokinetic torque converter transmissions for use in automotive vehicle drivelines, it is common practice to use a hydrokinetic torque converter comprising an impeller, a turbine, a stator and multiple ratio planetary gearing, the input element of the gearing being connected to the turbine and the impeller being connected to an internal combustion engine. Clutches and brakes actuated and released by fluid pressure operated servos are used to control the relative motion of the elements of the gearing thereby establishing plural underdrive speed ratios, a high speed, direct-drive ratio and a single reverse speed ratio.

In the improvement of my invention I have arranged multiple clutches in the shell of the converter for a hydrokinetic transmission of this type. The relative motion of the elements of the gearing can be controlled thereby eliminating the need for complex and space-consuming servos and friction elements in the mechanism.

The converter clutch structure includes a pair of clutch discs, one of which is adapted to engage frictionally the impeller housing. It is adapted also to be engaged by the other friction discs. The frictional driving connection thus established occurs at a radially outward location so that a maximum operating radius for the clutches is available, thus improving the torque transmitting capacity of the clutch.

The clutches are engaged and released by controlling the direction of distribution of fluid to the torus circuit. For this purpose the annular spaces between the clutch discs and between the aforesaid one clutch disc and the impeller housing define in part the torus fluid flow path followed by the toroidal fluid as it circulates through the converter. If the spaces are pressurized, they serve as a part of the torus feed passage, and the frictional driving relationship between the associated clutch elements will be disestablished. On the other hand, when the same spaces are exhausted and the torus circuit of the converter is fed with fluid through an auxiliary fluid passage, the friction discs become frictionally engaged under the influence of the circuit pressure.

The provision of a hydrokinetic transmission mechanism having a compound clutch structure capable of performing in this fashion is an object of my invention.

In pursuing another object of my invention I have provided a combination of a planetary gear system and a hydrokinetic torque converter wherein plural friction clutch elements in the impeller housing of the converter, together with the hydrokinetic elements, are adapted to establish a split torque delivery path whereby a portion of the torque delivered through the transmission system from the engine to the driven member occurs hydrokinetically and the balance of the torque is distributed mechanically through a solid driving connection that is established in part by the compound clutch structure. In other operating modes, the same compound clutch structure in the impeller housing is used to establish a fully mechanical drive between the crankshaft of the engine and the driven member of the transmission system as the hydrokinetic portion of the torque delivery path is bypassed.

In other operating modes, a solid connection is established as the gearing is conditioned for operation in either the lowest underdrive ratio or the intermediate underdrive ratio. This solid driving connection in the lowest underdrive ratio is an alternate underdrive condition that may be selected in addition to the underdrive ratios that occur when the hydrokinetic unit is functional.

The three so-called "lock-up" driving conditions and the split torque driving condition can be achieved in addition to the usual three forward driving speed ratios and the single reverse speed ratio without increasing the total number of friction torque establishing devices beyond the number that normally would be found in conventional, multiple-ratio, hydrokinetic transmission systems used in automotive vehicle drivelines.

Particular description of the invention

Figure 1:
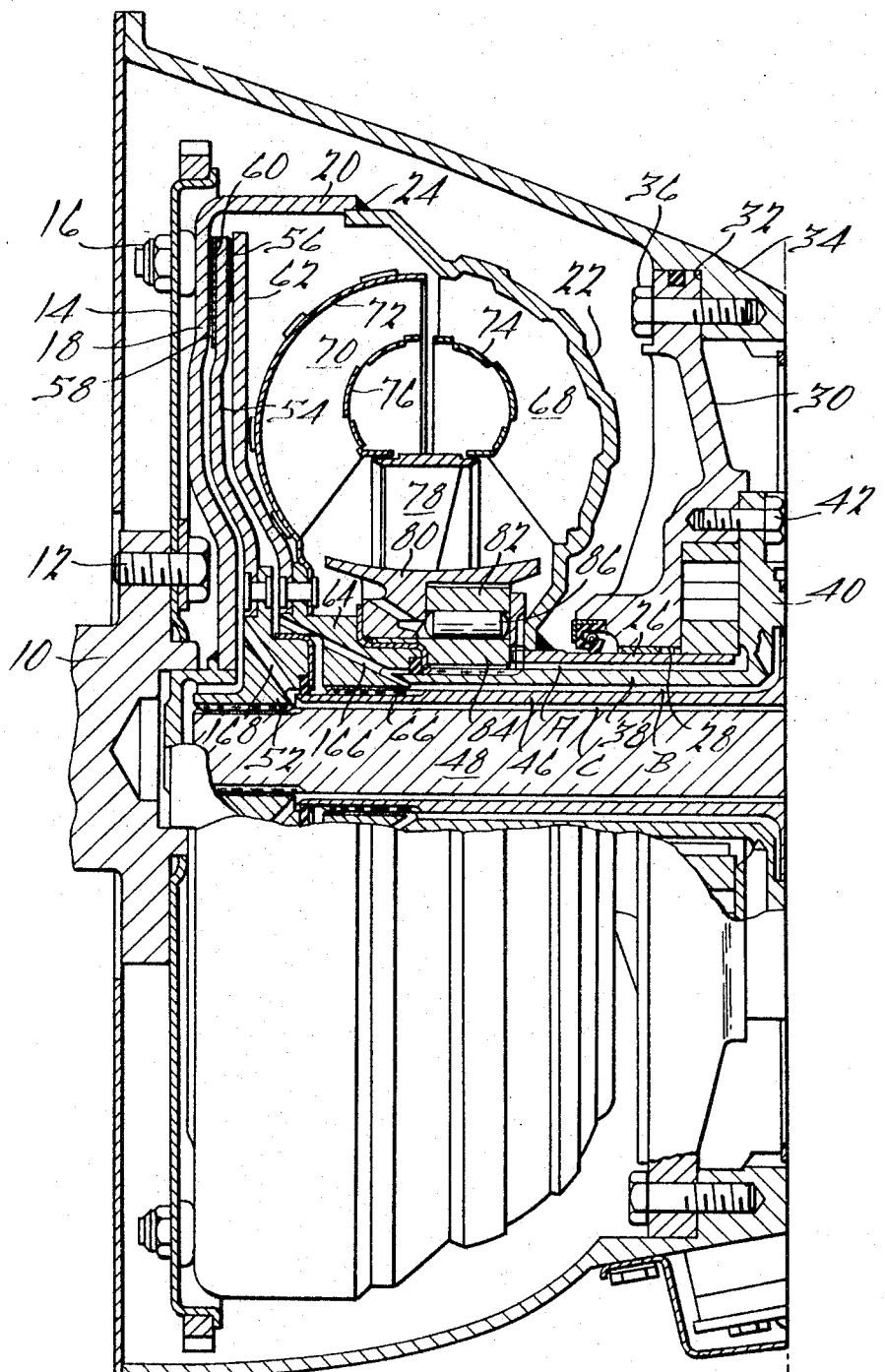
FIGURE 1 shows in longitudinal cross-sectional form the hydrokinetic portion of the transmission mechanism of my invention, including the compound converter clutches located in the impeller housing.

In FIGURE 1 numeral 10 designates one end of an internal combustion engine crankshaft. It is bolted by bolts 12 to a drive plate 14, the outer periphery of which is secured by bolts 16 to an impeller shell part 18. The shell part form a part of an impeller shell 20, which also includes shell part 22. The shell parts 18 and 22 are welded at the periphery 24.

The hub of shell part 22 is joined to sleeve shaft 26, which is journalled in bearing opening 28 formed in the transmission support wall 30. This wall is secured at its outer margin to an internal shoulder 32 formed in the transmission housing 34, suitable bolts 36 being provided for this purpose.

A stator support sleeve shaft 38, which extends through sleeve shaft 26, is joined at its right-hand end to a pump cover 40 secured by bolts 42 to the wall 30. An annular boss 44 is joined to the cover 40. This provides a bearing support for turbine sleeve shaft 46, which extends through the stator sleeve shaft 38. A centrally disposed torque delivery shaft 48 extends through the sleeve shaft 46 and is journalled therein at its right-hand end, as indicated at 50. It is splined at its left-hand end to hub 52 for a clutch disc 54. The outer margin of the disc has friction material formed on each of its two sides, as shown at 56 and 58. Friction material 58 is disposed directly adjacent friction surface 60 formed on the inner surface of shell part 18.

A second clutch disc 62 is situated directly adjacent friction material 56. It extends radially inwardly and is secured at its inner margin to hub 64. This hub is splined at 66 to the sleeve shaft 46.

The impeller shell part 22 has secured therein impeller blades 68, which define radial outflow passages that are in toroidal fluid communication with radial inflow passages defined by turbine blades 70. A turbine outer shroud 72, to which the blades 70 are joined, is secured at its margin to the hub 64. The impeller is provided with an inner shroud 74 and the corresponding inner shroud for the turbine is shown at 76. A bladed stator 78 situated in the space between the turbine flow exit region and the impeller flow entrance region is formed with a hub 80, which receives an overrunning brake outer race 82. An overrunning brake inner race 84 is splined to the stator sleeve shaft 38. Overrunning brake elements 86 are situated between the races 82 and 84 so that the stator can rotate in the direction of rotation of the impeller, but rotary motion of the stator in the opposite direction is prevented.

Figure 2:
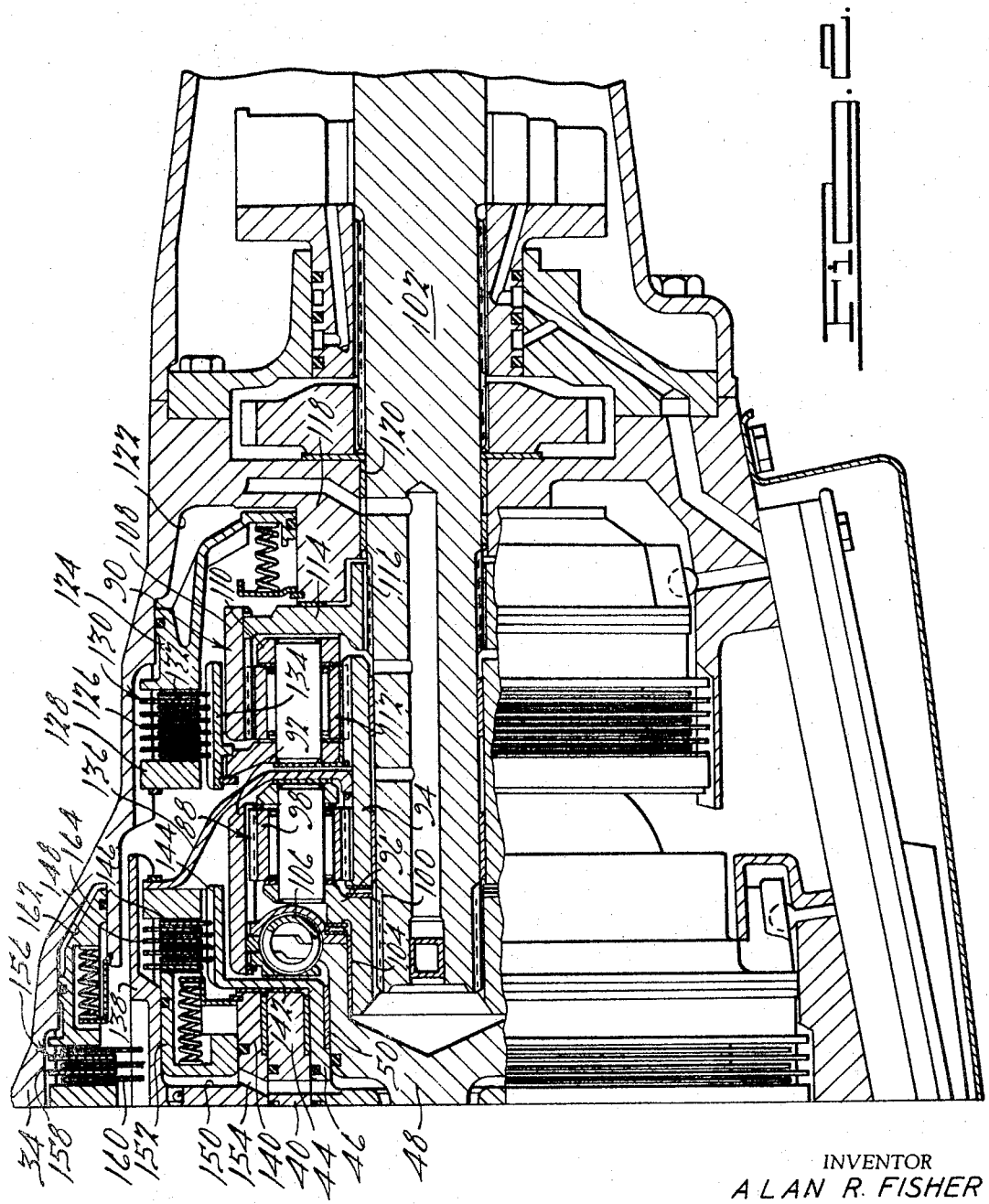
FIGURE 2 shows the planetary gearing portion of the transmission mechanism of my invention. This view, together with FIGURE 1, complete the cross-sectional representation of a preferred embodiment of my invention.

In FIGURE 2 there is shown a pair of simple planetary gear units identified generally by reference characters 88 and 90. Gear unit 88 comprises a ring gear 92, sun gear 94, a planet carrier 96 and planet pinions 98 journalled on the carrier 96 in meshing engagement with the ring gear 92 and the sun gear 94. The carrier 96 is splined at 100 to power output shaft 102. This may be connected by a suitable driveshaft and differential and axle assembly to the vehicle traction wheels.

Carrier 96 is journalled rotatably within the shaft 48, bearing 104 being provided for this purpose. Ring gear 92 is joined to shaft 48 through a torsional damper spring assembly 106.

Planetary gear unit 90 includes ring gear 108, planet carrier 110, pinions 112 journalled on the carrier 110 and sun gear 94 which is common to both gear units. Pinions 112 mesh with the sun gear 94 and the ring gear 108. Ring gear 108 is carried by drive member 114, which is splined at 116 to the power output shaft 102.

The transmission housing 34 is formed with a transmission end wall 118, which is provided with a bearing opening 120 in which the shaft 102 is journalled. Wall 118 defines an annular cylinder 122 which receives annular piston 124. Brake discs 126 are splined to the interior of the housing 34, together with a reaction ring 128. These form in part a multiple disc brake assembly 130, which includes also brake discs 132 carried by an externally splined brake element 134. This in turn is carried by the carrier 110. The piston 124, when it is actuated by fluid pressure admitted to the cylinder 122, applies the friction brake discs, thereby anchoring the carrier 110.

Sun gear 94 is journalled on shaft 102. It is connected by means of a spline connection to the inner margin of a torque transfer shell 136, which extends between the gear units 90 and 88.

The outer margin of the torque transfer shell 136 is keyed or splined to the inner periphery of clutch drum 138. This drum is journalled at its hub 140 on a stationary sleeve extension 44. The right-hand end of the sleeve shaft 46 is flanged at 142, and it carries externally splined clutch element 144. Clutch discs 146 are carried by the element 144, and cooperating clutch discs 148 are carried by an internally splined portion of the drum 138. Drum 138 defines an annular cylinder 150 in which is situated an annular piston 152. This cooperates with the cylinder 150 to define a pressure cavity which is in fluid communication with a clutch feed passage 154. When the cylinder 150 is pressurized, the piston 152 frictionally engages the discs 148 and 146 to establish a driving connection between the sun gear 94 and the sleeve shaft 46.

The sun gears 94 can be anchored by a selectively engageable friction brake 156. This includes brake discs 158, carried by an internally splined part of the housing 34, and brake discs 160 carried by an externally splined part of the clutch drum 138. The housing 34 defines an annular cylinder 162 in which is situated slidably annular piston 164. These cooperate to define a pressure cavity that is in fluid communication with a feed passage not shown. When fluid pressure is admitted behind the piston 164, discs 158 and 160 are frictionally engaged, thereby anchoring the clutch drum 138 and the sun gear 94 against rotation. Sun gear 94 thus can serve as a reaction member as reaction torque is distributed to the transmission housing 34.

The torus circuit of the converter is supplied with circuit pressure by admitting fluid through the annular space defined by the sleeve shafts 38 and 46. This space is in fluid communication through passage 166 with the annular space between the clutch discs 62 and 54. It is possible to supply the torus circuit with fluid pressure also through the annular passage defined by the sleeve shaft 46 and the central shaft 48. This passage is in fluid communication through passage 168 with the annular space between clutch disc 54 and the radial wall 18 of the impeller shell part 20. A converter fluid flow passage is defined also by the annular space between sleeve shafts 26 and 38. When fluid pressure is admitted to the fluid circuit through the annular space between sleeve shafts 26 and 38, and if the spaces between discs 54 and 62 and between discs 54 and wall 18 are exhausted, a tendency will exist for fluid flow to pass radially inwardly across the discs 62 and 54. This will cause a pressure drop at the radially outward margins of the discs, thereby causing the discs to be frictionally engaged and immediately interrupting the flow. The discs thus become locked to the impeller shell. Turbine shaft 46, shaft 48 and the impeller all rotate in unison under these conditions.

If the annular space between shafts 38 and 46 is pressurized so that it will function as a feed passage rather than as an exhaust passage, the end of the passage between shafts 46 and 48 is exhausted along with the passage between sleeve shafts 26 and 38. Fluid will be fed to the circuit radially outwardly between the discs 54 and 62. The pressure that exists in the torus circuit will cause the disc 54 to frictionally engage the wall 18 of the impeller shell, thereby locking the impeller to the shaft 48. This establishes a direct connection between the ring gear 92 and the engine crankshaft 10.

If both of the passages between shafts 38 and 46 and between shafts 46 and 48 are pressurized so that they both function as feed passages, clutch discs 62 and 54 will be released from each other as well as from the impeller. The annular space between shafts 26 and 38 under these conditions will serve as a flow return passage.

With the annular space between the discs 54 and 62 exhausted and with the annular space between the disc 54 and the wall 18 pressurized, the discs 54 and 62 will serve as a forward drive clutch so that turbine torque will be delivered directly to the shaft 48 and hence to the ring gear 92.

Figure 3:
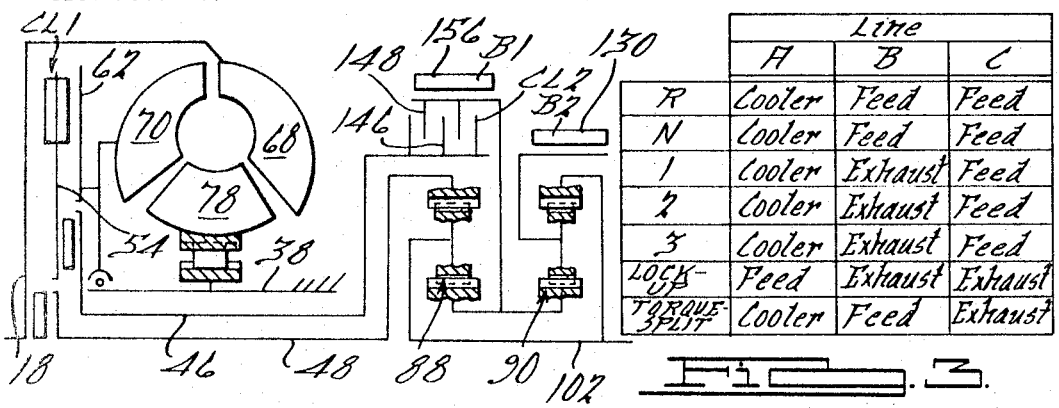
FIGURE 3 is a schematic illustration of the torque delivery elements of the structure of FIGURES 1 and 2.

In FIGURE 3 I have illustrated in schematic form the principal elements of the construction shown in FIGURES 1 and 2. For purposes of simplicity, I have identified the two friction brakes 156 and 130 by the symbols B1 and B2, respectively. The multiple disc clutch shown in part at 148 and 146 is identified in FIGURE 3 as clutch CL2. The compound clutch within the impeller housing is identified by reference character CL1. The annular space between shafts 26 and 38 is identified in FIGURE 3 as line A. The annular space between shafts 38 and 46 is identified as line B and the annular space between shaft 46 and shaft 48 is identified as line C.

To condition the transmission mechanism for low speed ratio, forward-drive operation, line B is exhausted and line C is pressurized. Line A is connected to the cooler, which in turn is in fluid communication with the transmission lubricating system. This causes clutch discs 54 and 62 to become frictionally engaged. Engine torque delivered to the impeller will establish fluid circulation in the converter, thereby developing a turbine torque. This turbine torque is transferred through engaged clutch discs 54 and 62 for clutch CL1 and through shaft 48 to the ring gear 92. This will tend to create rearward motion of the sun gear 94 relative to the direction of motion of the ring gear 92, thereby driving the carrier 110 in a rearward direction. Rearward motion is prevented, however, by the brake 130, which is applied. Thus carrier 110 serves as a reaction point for the gear system. The forward driving torque delivered to the ring gear 108 is transferred to the power output shaft 102. The forward driving torque delivered to the carrier 96 is transferred to the shaft 102 and also through a parallel torque delivery path.

To establish a torque ratio change from the lowest ratio to the second underdrive ratio, brake 130 (B2) is released and brake 156 (B1) is applied. This anchors sun gear 94 so that the sun gear now will act as a reaction point as the torque in the turbine is delivered to ring gear 92. Gear unit 90 forms no part of the torque delivery path under these conditions. Direct drive is achieved by disengaging brake 156 (B1) and, in sequence with the disengagement of the brake B1, engaging the clutch CL2. With the clutch discs 62 and 54 and with the clutch CL2 applied, the planetary gear system is "locked-up" for rotation in unison as the turbine acts as a torque input element.

After a direct drive condition is achieved, it is possible to obtain a fully locked-up condition and to remove the hydrokinetic unit from the power flow path by engaging the disc 54 with the impeller shell wall 18. This is done by exhausting line C and by continuing to exhaust line B. At the same time line A serves as a torus feed passage. The impeller and the turbine thus become locked together for rotation in unison. Fluid circulation through the unit is prevented because all of the exhaust flow paths are blocked. The circuit is pressurized and the clutch CL1 is fully applied by the torus circuit pressure that is distributed to the torus circuit through line A.

It is possible also to establish a split torque delivery condition if this is desired. Only a portion of the torque delivered is distributed through the turbine member hydrokinetically at that time as the balance of the torque is distributed mechanically. To accomplish this split torque condition, line B is pressurized and line C is exhausted. Line A functions as a flow return passage which communicates with the oil cooler and with the lubricating system. Thus the clutch disc 54 will frictionally engage the wall 18 of the impeller shell to establish a driving connection between shaft 48 and the crankcase. The turbine is connected directly to the turbine shaft 46. Thus torque is delivered mechanically to the ring gear 92 through the shaft 48. At the same time turbine torque from the hydrokinetic unit is distributed through the shaft 46 and through the engaged clutch CL2 to the sun gear 94. Again the gear unit 90 does not form a part of the torque delivery path under these split torque drive conditions.

Reverse drive is achieved by engaging clutch CL2 and disengaging clutch CL1. This requires distribution of converter feed pressure to each of the lines B and C as line A is exhausted. Turbine torque now is distributed through turbine shaft 46 and through the engaged clutch CL2 to the sun gear 94. Brake 130 (B2) is applied so that the carrier 110 for the rear planetary gear unit 90 will act as a reaction member. The ring gear 108 now will be driven in a reverse direction relative to the direction of rotation of the turbine. Power output shaft 102 thus is driven in a reverse direction.

In addition to the foregoing drive conditions, it is possible to achieve a lock-up drive condition in the first underdrive ratio as well as in the second underdrive ratio, thus by-passing entirely the hydrokinetic torque delivery path. A lock-up condition in the lowest ratio is achieved by exhausting simultaneously lines B and C as line A is pressurized. This causes the clutch disc 62 and 54 to become locked to the impeller shell. If at that time the brake B2 is applied and the clutch CL2 is released, turbine torque will be delivered directly to the ring gear 92 and a fully mechanically low speed ratio condition will be established through the gear.

A fully mechanical, locked-up, intermediate ratio drive condition is achieved by maintaining the converter clutches in the same lock-up condition and by releasing brake B2 while applying brake B1. This causes sun gear 94 again to act as a reaction member as the carrier 96 serves as the power output element of the gearing.

A direct drive lock-up condition in either low or intermediate can be achieved in the manner described, but with the line C acting as a feed passage rather than as an exhausted passage.

Figure 4:
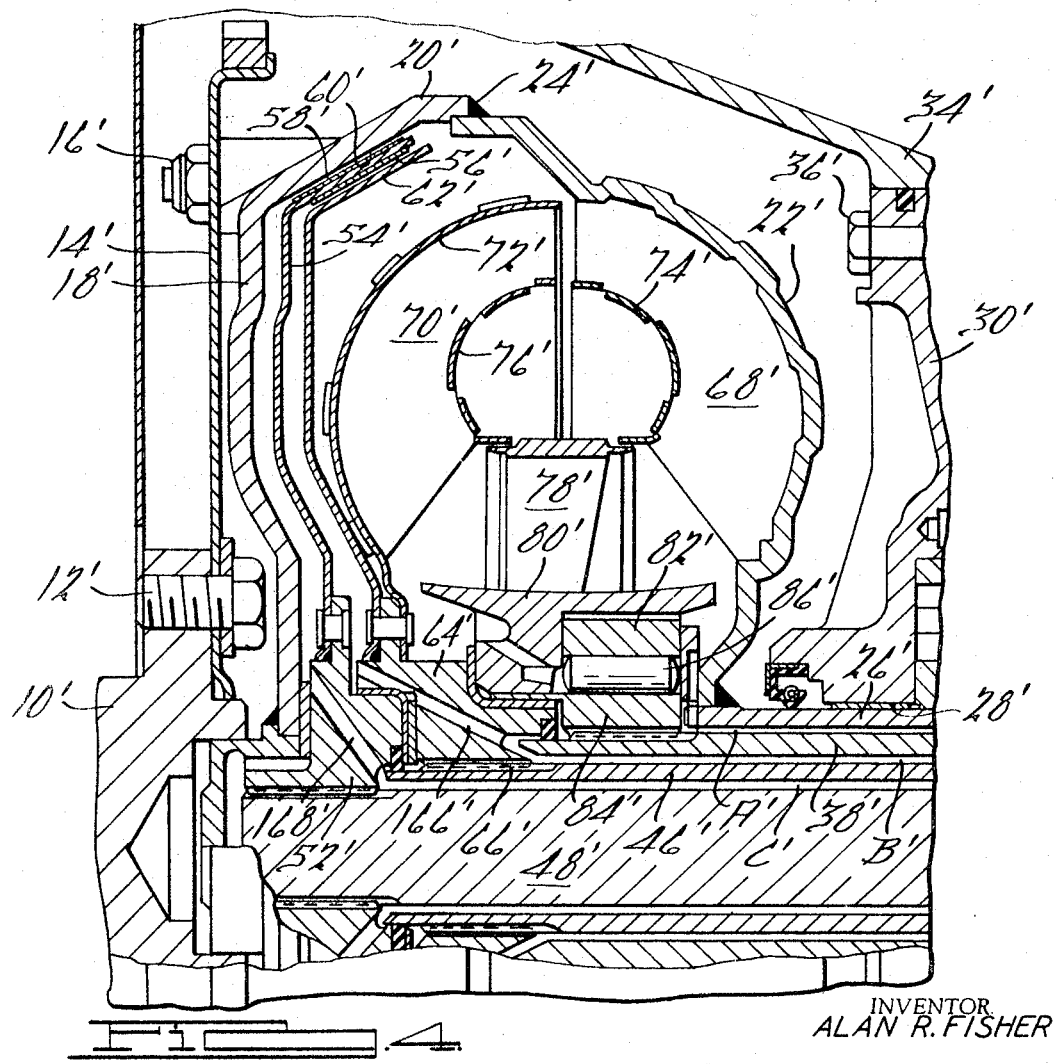
FIGURE 4 is a modification of the hydrokinetic portions of the mechanism wherein the plural friction disc clutches of FIGURE 1 have been replaced by friction cone clutches, although the clutch functions are unchanged.

FIGURE 4 shows a modified construction employing cone clutches that corerspond to the clutches shown in part at 54 and 62. The elements of FIGURE 4 that have counterparts in FIGURE 1 have been identified by similar reference characters.

Having thus described preferred embodiments of my invention, what I claim and desire to secure by U.S. Letters Patent is:

1. A hydrokinetic, multiple-ratio, power transmission mechanism for delivering torque from a driving member to a driven member and comprising a hydrokinetic unit having a bladed impeller and a bladed turbine situated in toroidal fluid flow relationship, a converter housing surrounding and connected to said impeller and enclosing said turbine, a driving connection between said driving member and said impeller housing, a pair of torque delivery shafts extending through said hydrokinetic unit, one shaft being connected to said turbine, multiple ratio gearing having two input elements, said driven member being connected to output portions of said gear, one of said shafts being connected to one power input element, clutch means for connecting a second of said shafts to the second power input element, a pair of clutch discs in said impeller housing and situated adjacent one wall of said housing, each disc being connected to a separate one of said shafts, said discs defining therebetween an annular chamber, a second annular chamber situated between one of said discs and said wall, and multiple fluid flow passages communicating with the torus circuit of said converter, a separate one of said passages communicating with each of said annular chambers.

2. A hydrokinetic, multiple-ratio, power transmission mechanism for delivering torque from a driving member to a driven member and comprising a hydrokinetic unit having a bladed impeller and a bladed turbine situated in toroidal fluid flow relationship, a converter housing surrounding and connected to said impeller and enclosing said turbine, a driving connection between said driving member and said impeller housing, a pair of torque delivery shafts extending through said hydrokinetic unit, one shaft being connected to said turbine, multiple ratio gearing having two input elements, said driven member being connected to output portions of said gearing, one of said shafts being connected to one power input element, clutch means for connecting a second of said shafts to the second power input element, a pair of clutch discs in said impeller housing and situated adjacent one wall of said housing, each disc being connected to a separate one of said shafts, said discs defining therebetween an annular chamber, a second annular chamber situated between one of said discs and said wall, and multiple fluid flow passages communicating with the torus circuit of said converter, a separate one of said passages communicating with each of said annular chambers, said wall defining a friction surface, said friction surface being situated adjacent the radially outward portion of a first of said clutch discs, the opposite side of said first clutch disc at its outer periphery being situated directly adjacent a friction surface on the other disc, and said second annular chamber and said first annular chamber each defining a radial outflow converter torus feed passage, said passages distributing selectively pressure to each of said annular chambers and selectively exhausting the same whereby said discs may be clutched in unison to said impeller housing, said one disc may be clutched to said housing while the other disc is free and said discs may be clutched together for rotation in unison independently of said housing.

3. The combination as set forth in claim 1 wherein one of said torque delivery shafts is situated concentrically within the other, said one shaft being connected directly to the radially inward part of said one clutch disc, the other shaft being connected directly to said turbine and to the radially inward part of said other disc.

4. The combination as set forth in claim 2 wherein one of said torque delivery shafts is situated concentrically within the other, said one shaft being connected directly to the radially inward part of said one clutch disc, the other shaft being connected directly to said turbine and to the radially inward part of said other disc.

5. The combination as set forth in claim 1 wherein said multiple ratio gearing comprises two simple planetary gear units, each gear unit having a ring gear, a sun gear, a carrier, and planet pinions journalled on said carrier in meshing engagement with said sun or ring gears, one of said shafts being connected to the ring gear of the first of said gear units, selectively engageable clutch means for connecting the other of said shafts to the sun gears for said gear units, said sun gears being connected together, the ring gear of said other unit and the carrier of said first gear unit being connected to said driven member, selectively engageable brake means for anchoring the carrier of said second gear unit, selectively engageable brake means for anchoring the sun gear of said second gear unit during intermediate speed ratio operation, said selectively engageable clutch means being applied during first speed ratio operation and reverse drive operation and said brake means for the carrier of said second gear unit being applied during reverse drive operation and low speed ratio operation.

6. The combination as set forth in claim 2 wherein said multiple ratio gearing comprises two simple planetary gear units, each gear unit having a ring gear, a sun gear, a carrier, and planet pinions journalled on said carrier in meshing engagement with said sun or ring gears, one of said shafts being connected to the ring gear of the first of said gear units, selectively engageable clutch means for connecting the other of said shafts to the sun gears for said gear units, said sun gears being connected together, the ring gear of said other unit and the carrier of said first gear unit being connected to said driven member, selectively engageable brake means for anchoring the carrier of said second gear unit, selectively engageable brake means for anchoring the sun gear of said second gear unit during intermediate speed ratio operation, said selectively engageable clutch means being applied during first speed ratio operation and reverse drive operation and said brake means for the carrier of said second gear unit being applied during reverse drive operation and low speed ratio operation.

7. The combination as set forth in claim 3 wherein said multiple ratio gearing comprises two simple planetary gear units, each gear unit having a ring gear, a sun gear, a carrier, and planet pinions journalled on said carrier in meshing engagement with said sun or ring gears, one of said shafts being connected to the ring gear of the first of said gear units, selectively engageable clutch means for connecting the other of said shafts to the sun gears for said gear units, said sun gears being connected together, the ring gear of said other unit and the carrier of said first gear unit being connected to said driven member, selectively engageable brake means for anchoring the carrier of said second gear unit, selectively engageable brake means for anchoring the sun gear of said second gear unit during intermediate speed ratio operation, said selectively engageable clutch means being applied during first speed ratio operation and reverse drive operation and said brake means for the carrier of said second gear unit being applied during reverse drive operation and low speed ratio operation.

8. The combination as set worth in claim 4 wherein said multiple ratio gearing comprise two simple planetary gear units, each gear unit having a ring gear, a sun gear, a carrier, and planet pinions journalled on said carrier in meshing engagement with said sun or ring gears, one of said shafts being connected to the ring gear of the first of said gear units, selectively engageable clutch means for connecting the other of said shafts to the sun gears for said gear units, said sun gears being connected together, the ring gear of said other unit and the carrier of said first gear unit being connected to said driven member, selectively engageable brake means for anchoring the carrier of said second gear unit, selectively engageable brake means for anchoring the sun gear of said second gear unit during intermediate speed ratio operation, said selectively engageable clutch means being applied during first speed ratio operation and reverse drive operation and said brake means for the carrier of said second gear unit being applied during reverse drive operation and low speed ratio operation.

9. The combination as set forth in claim 5 wherein said hydrokinetic unit comprises a bladed stator situated between the flow exit region of said turbine and the flow entrance region of said impeller, a stationary sleeve shaft surrounding said torque delivery shafts, a sleeve shaft connected radially inward to a part of said impeller shell and surrounding said stator sleeve shaft, said impeller sleeve shaft and said stator sleeve shaft defining a toroidal fluid flow path in fluid communication with the interior of the torus circuit of said hydrokinetic unit, said hydrokinetic torus circuit being pressurized with the fluid pressure admitted through said last-mentioned feed passage as the annular spaces between said clutch discs and between said one clutch and said impeller shell wall are exhausted, thereby establishing a direct, mechanical, lock-up drive between said power input shaft and at least one power input element of said gearing.

10. The combination as set forth in claim 6 wherein said hydrokinetic unit comprises a bladed stator situated between the flow exit region of said turbine and the flow entrance region of said impeller, a stationary sleeve shaft surrounding said torque delivery shafts, a sleeve shaft connected radially inward to a part of said impeller shell and surrounding said stator sleeve shaft, said impeller sleeve shaft and said stator sleeve shaft defining a toroidal fluid flow path in fluid communication with the interior of the torus circuit of said hydrokinetic unit, said hydrokinetic torus circuit being pressurized with the fluid pressure admitted through said last-mentioned feed passage as the annular spaces between said clutch discs and between said one clutch and said impeller shell wall are exhausted, thereby establishing a direct, mechanical, lock-up drive between said power input shaft and at least one power input element of said gearing.

11. The combination as set forth in claim 7 wherein said hydrokinetic unit comprises a bladed stator situated between the flow exit region of said turbine and the flow entrance region of said impeller, a stationary sleeve shaft surrounding said torque delivery shafts, a sleeve shaft connected radially inward to a part of said impeller shell and surrounding said stator sleeve shaft, said impeller sleeve shaft and said stator sleeve shaft defining a toroidal fluid flow path in fluid communication with the interior of the torus circuit of said hydrokinetic unit said hydrokinetic torus circuit being pressurized with the fluid pressure admitted through said last-mentioned feed passage as the annular spaces between said clutch discs and between said one clutch and said impeller shell wall are exhausted, thereby establishing a direct, mechanical, lock-up drive between said power input shaft and at least one power input element of said gearing.

12. The combination as set forth in claim 8 wherein said hydrokinetic unit comprises a bladed stator situated between the flow exit region of said turbine and the flow entrance region of said impeller, a stationary sleeve shaft surrounding said torque delivery shafts, a sleeve shaft connected radially inward to a part of said impeller shell and surrounding said stator sleeve shaft, said impeller sleeve shaft and said stator sleeve shaft defining a toroidal fluid flow path in fluid communication with the interior of the torus circuit of said hydrokinetic unit, said hydrokinetic torus circuit being pressurized with the fluid pressure admitted through said last-mentioned feed passage as the annular spaces between said clutch discs and between said one clutch and said impeller shell wall are exhausted, thereby establishing a direct, mechanical, lock-up drive between said power input shaft and at least one power input element of said gearing.

References Cited

UNITED STATES PATENTS

| | | | |
|---|---|---|---|
| 2,142,199 | 1/1939 | Lysholm et al. | 192—3.25 |
| 2,607,456 | 8/1952 | Jandasek | 192—3.28 X |
| 2,717,673 | 9/1955 | Feidler | 192—3.3 |
| 2,737,824 | 3/1956 | Livermore | 192—3.3 X |
| 3,182,775 | 5/1965 | Schall | 192—3.27 |
| 3,277,744 | 10/1966 | Stockton | 74—688 X |

ARTHUR T. McKEON, Primary Examiner

U.S. Cl. X.R.

192—3.26, 3.3